US007103345B1

(12) United States Patent
Lipsanen et al.

(10) Patent No.: US 7,103,345 B1
(45) Date of Patent: Sep. 5, 2006

(54) CALL INFORMATION OUTPUT IN A TELECOMMUNICATION NETWORK

(75) Inventors: Mikko Lipsanen, Aura (FI); Patrik Kim Nilsson, Turku (FI); Patrik Kjell-Johan Palm, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/700,585

(22) PCT Filed: May 17, 1999

(86) PCT No.: PCT/FI99/00424

§ 371 (c)(1),
(2), (4) Date: Feb. 2, 2001

(87) PCT Pub. No.: WO99/60770

PCT Pub. Date: Nov. 25, 1999

(30) Foreign Application Priority Data

May 18, 1998  (FI) ...................................... 981105

(51) Int. Cl.
*H04Q 7/36* (2006.01)
*H04Q 7/20* (2006.01)

(52) U.S. Cl. ..................... 455/406; 455/408; 455/405; 455/422.1; 455/403; 455/426.01; 379/114.01; 379/114.03; 379/126; 379/127.01; 379/114.27; 379/114.28

(58) Field of Classification Search ............... 455/406, 455/407, 408, 403, 422.01, 517, 426.01, 455/550.01, 560, 554, 555, 445, 558, 500, 455/412.1, 412.2, 433, 552.1, 405; 379/114.01, 379/114.03, 114.04, 11.27, 114.28, 114.29, 379/115.01, 121.01, 121.05, 202.01, 126, 379/127.01

See application file for complete search history.

(56) References Cited

U.S. PATENT DOCUMENTS

| 5,732,128 | A  | * | 3/1998 | Bushnell ..................... 379/119 |
| 5,764,750 | A  |   | 6/1998 | Chau et al. |
| 5,784,443 | A  | * | 7/1998 | Chapman et al. ........... 379/119 |
| 5,930,344 | A  | * | 7/1999 | Relyea et al. ............... 379/126 |
| 6,173,171 | B1 | * | 1/2001 | Plush et al. ................. 455/408 |
| 6,205,210 | B1 | * | 3/2001 | Rainey et al. ......... 379/114.01 |
| 6,373,931 | B1 | * | 4/2002 | Amin et al. ........... 379/114.01 |
| 2004/0022235 | A1 | * | 2/2004 | Vaziri et al. ................ 370/352 |

* cited by examiner

Primary Examiner—Keith T. Ferguson

(57) ABSTRACT

A method of providing information relating to a telephone call, in a GSM cellular radio telephone network, to a data storage system. The method comprises receiving caller identity information at a Mobile Switching Centre (MSC) of the network during a call set-up procedure between a mobile station and the MSC and storing the information at least temporarily at the MSC. An incoming call alert message is sent by the MSC to a called device. In the event that the called device answers or otherwise accepts the incoming call alert, a call answer message is sent to the MSC. In response to receipt of the call answer message, at least the received and stored caller identity information is output from the MSC to the data storage system.

9 Claims, 2 Drawing Sheets

CALL INFORMATION OUTPUT IN A TELECOMMUNICATION NETWORK

FIELD OF THE INVENTION

The present invention relates to a method and apparatus for outputting call information in a telecommunication network.

BACKGROUND OF THE INVENTION

In telecommunication networks such as fixed access networks and cellular radio telephone networks there is usually a need to record call information at at least one exchange of the network. This information may include the identity of a caller (A-number), the identity of the called party (B-number), and the duration of a call. In cellular radio telephone networks, the recorded information may also include the International Mobile Subscriber Identity (IMSI) code of the Subscriber Identity Module (SIM) used with the calling mobile telephone, and the International Mobile Equipment Identity (IMEI) code of the calling telephone itself. Both the IMSI and IMEI codes are typically sent by a mobile telephone to the cellular network during a call set-up phase. For a given call, a record stored in an exchange is normally output to a centralised billing system of the network upon termination of the call. Historically, this record has been referred to as a "Toll Ticket" (TT) although more recently the term "Call Data Record" (CDR) has been used.

U.S. Pat. No. 5,506,893 describes a telecommunication network in which a CDR is output from a switching centre to an external billing system upon termination of a call.

SUMMARY OF THE INVENTION

According to a first aspect of the present invention there is provided a method of providing information relating to a telecommunication call, in a telecommunication network, to a data storage system, the method comprising:

receiving caller identity information at an exchange of the network during a call set-up procedure between a calling device and the exchange, and storing the information at least temporarily at the exchange;

sending an incoming call alert message to a called device;

prior to receiving a call answer message at the exchange, or in direct response to receipt of a call answer message, outputting from the exchange to said data storage system a Call Data Record containing at least the received caller identity information.

Embodiments of the present invention provide for the output of call information at a very early stage in a call, i.e. immediately following the answering of the call or during the call set-up phase. This makes possible, for example, real-time billing and fraud detection prior to or during a call.

In certain embodiments of the present invention, the telecommunication network comprises a cellular radio telephone network and the call is made from a cellular radio telephone device. The exchange from which the call information is output is then the Mobile Switching Centre (MSC). The information may include at least one of the subscriber telephone number, IMEI code, IMSI code, or B-number.

In other embodiments of the present invention, the telecommunication network comprises a fixed access network in which telephone device is coupled to the exchange via land lines. The information output by the exchange preferably includes the caller's telephone number (A-number) and the called number (B-number).

According to a second aspect of the present invention there is provided apparatus for providing information relating to a telecommunication call, in a telecommunication network, to a data storage system, the apparatus comprising:

first receiving means for receiving caller identity information at an exchange of the network during a call set-up procedure between a calling device and the exchange, and for storing the information at least temporarily at the exchange;

transmitting means for transmitting an incoming call alert message to a called device;

second receiving means for receiving, in the event that the called device answers or otherwise accepts the incoming call alert, a call answer message sent to the exchange; and output means for outputting, prior to, or in response to, receipt of said call answer message, from the exchange to said data storage system, a Call Data Record containing at least the received caller identity information.

Preferably, said first and second receiving means, said transmitting means, and said output means are provided as an integral part of the network exchange. Where the network comprises a cellular radio telephone network, the exchange is a Mobile Switching Centre (MSC). The MSC may be contained within a housing which is physically spaced apart from an external billing system which is arranged to receive the Call Data Record output by the MSC. More preferably, a plurality of MSCs are arranged to provide the output CDRs to a common external billing system.

According to a third aspect of the present invention there is provided a telecommunication network having a plurality of interconnected exchanges for routing calls in the network, and a common billing system coupled to each of said exchanges, each exchange comprising:

first receiving means for receiving caller identity information during a call set-up procedure between a calling device and the exchange, and for storing the information at least temporarily at the exchange;

transmitting means for transmitting an incoming call alert message to a called device or to a called device via one or more further exchanges;

second receiving means for receiving, in the event that the called device answers or otherwise accepts the incoming call alert, a call answer message sent to the exchange; and output means for outputting, prior to or in response to receipt of said call answer message, from the exchange to a data storage system, a Call Data Record containing at least the received caller identity information.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF EMBODIMENTS

Figure 1:
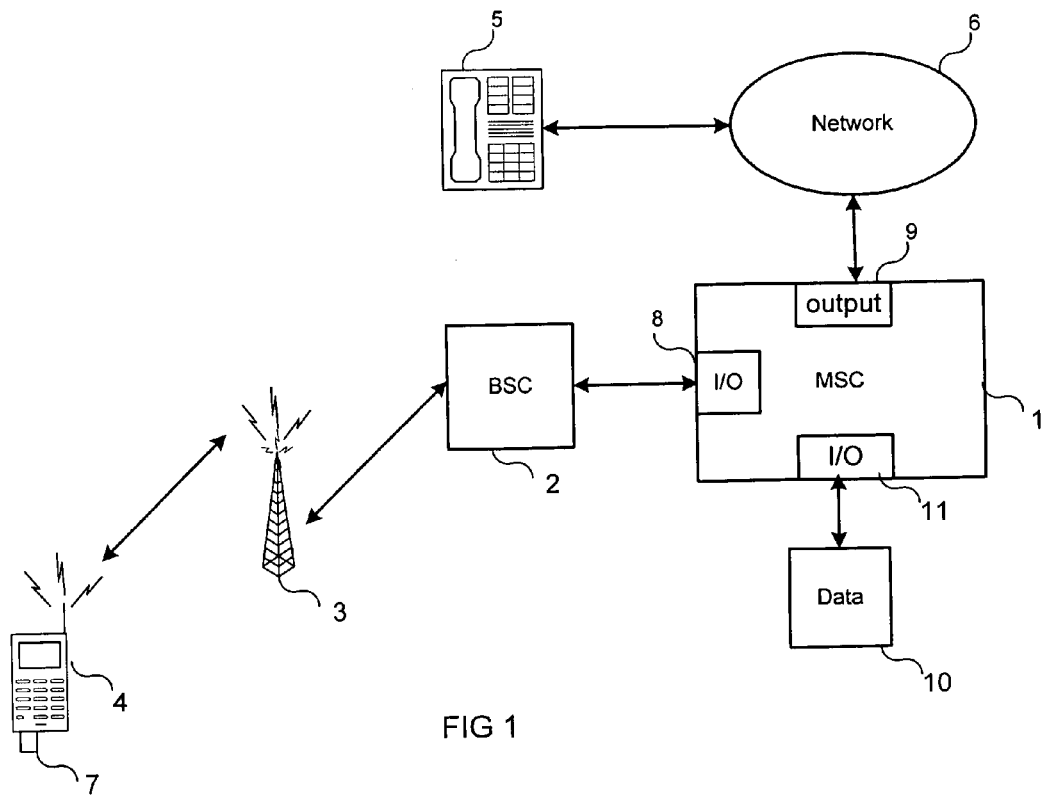
FIG. 1 shows schematically a telecommunication network including a cellular radio telephone network.

There is shown in FIG. 1 a telecommunication network comprising a Global System for Mobile Communications (GSM) cellular radio telephone network and a fixed access network. The former consists of a Mobile Switching Centre (MSC) 1, a set of Base Station Controllers (BSC) 2 only one of which is shown in FIG. 1, and a set of Base Transceiver Stations (BTS) 3 again only one of which is shown in the Figure. The MSC, BSCs, and BTSs provide functionality as defined in the relevant European Telecommunications Standards Institute (ETSI) GSM standards.

In the GSM network, mobile stations such as that indicated by reference numeral 4 communicate with a BTS 3 over the air interface. User data and signaling messages are coupled between the BTS 3 and the MSC 1 via the BSC 2. The MSC 1 acts as an exchange of the GSM network, routing calls between a mobile station 4 and a called, or calling, station.

In the example of FIG. 1, the destination of a call from the mobile station 4 is a land line telephone 5 which belongs to a subscriber of a fixed access network 6. A call may be routed through several intermediate exchanges (e.g. in the case of an international call) and may also pass through several exchanges of the fixed access network, although for the sake of clarity these exchanges are not shown in FIG. 1. In the same way, it will be appreciated that a call may be routed through several MSCs 1 en route from the mobile station 4 to the fixed line telephone 5.

The mobile station 4 is provided with a Subscriber Identity Module (SIM) 7 which contains a solid state memory arranged to store a unique International Mobile Subscriber Identity (IMSI) code. The mobile station 4 itself has a solid state memory arranged to store a second unique code known as an International Mobile Equipment Identity (IMEI) code. The form of these two codes is defined in the relevant GSM standard.

When a user of the mobile terminal 4 places a call to the fixed line telephone 5 by dialing the B-number of that telephone, at least the IMSI code and the telephone number (A-number) assigned to the mobile terminal 4 are transmitted to an input/output device 8 of the MSC 1 on a signaling channel of the GSM network (the IMEI code may or may not be sent at this stage). In response to the call request, the MSC 1 first verifies the right of the mobile terminal 4 to use the services of the GSM network on the basis of the A-number and the IMSI code (e.g. using a database of subscribers of the GSM network).

Assuming that the mobile terminal 4 receives authorisation from the MSC 1 to place the call, the MSC 1 transmits an incoming call request from an output/output device 9 to the fixed line telephone 5 via the fixed access telephone network. A signaling protocol such as the Signaling System 7 (SS7) is used to relay the request between the MSC 1 and the various exchanges. When the request reaches the fixed line telephone 5, the phone rings in the normal manner.

If the call is answered at the fixed line telephone 5, then a call answer message is returned to the fixed access network 6, either by the telephone 5 or by some intermediate device, e.g. a concentrator. The call answer message is also transmitted back to the input/output device 9 of the MSC 1 of the GSM network, again using the SS7 signaling protocol.

Connected to the MSC 1 of the GSM network is a so-called input/output group device or external billing system 10. This may be a personal computer (PC), work station, data storage device or the like, which logs information concerning calls switched by the MSC 1. The information recorded by the external billing system 10 enables the operator of the GSM network to charge subscribers, trace calls, and identify calls made from "illegal" equipment. The latter is achieved using the transmitted IMSI code and also the IMEI code (if transmitted).

When the call answer message is received by the MSC 1 from the fixed line telephone 5, the MSC 1 provides a traffic channel (i.e. voice or data) to the mobile station 4 enabling the mobile subscriber to communicate with the fixed line telephone. In addition, receipt of the call answer message causes the MSC 1 to output to the external billing system 10, via an input/output device 11, the caller's A-number, IMSI code, the called party's B-number, and the call start time. This data is in the form of a partial Charging Data Record (CDR) and is recorded by the external billing system 10. When the call is terminated by one of the parties to the call hanging-up, a call termination message is received by the MSC, and a call end time output to the input/output group device 10 to complete the partial CDR.

Figure 2:
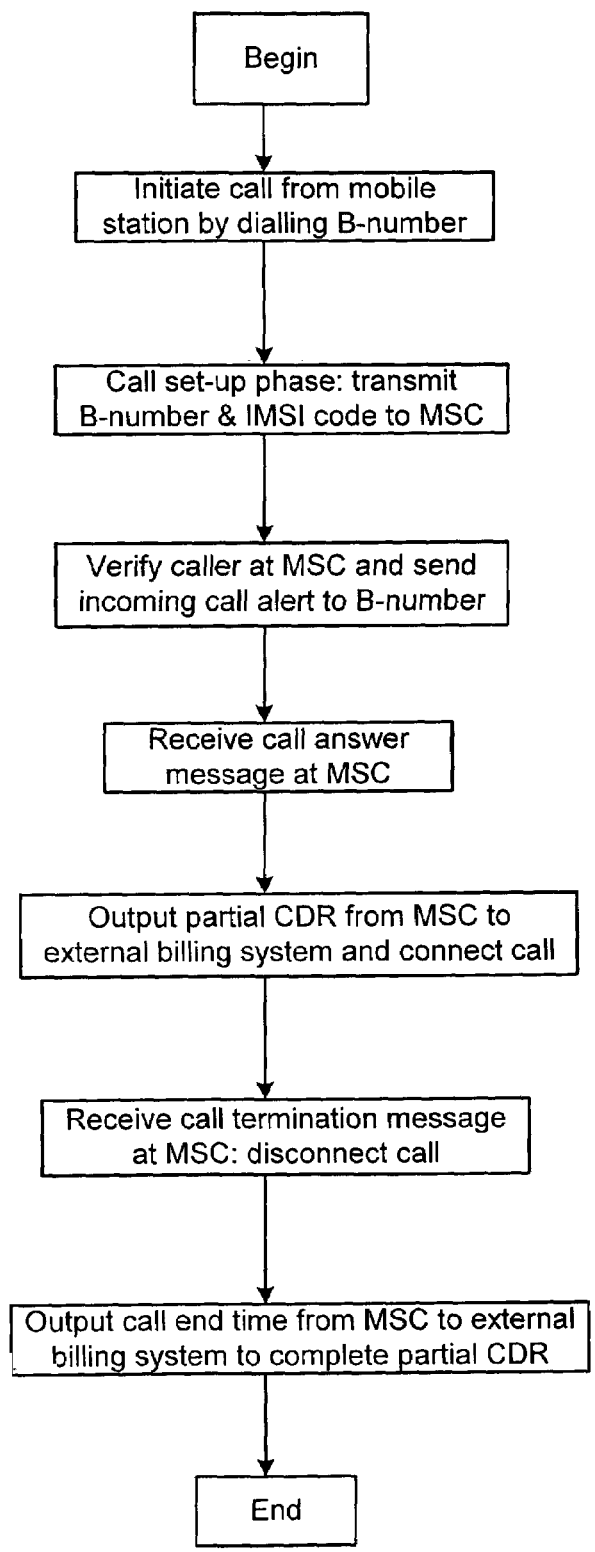
FIG. 2 is a flow diagram illustrating the method of operation of the telecommunication network of FIG. 1.

FIG. 2 is a flow chart illustrating the method of operation of the network of FIG. 1, and relates in particular to the output of the CDR to the external billing system 10.

The external billing system is physically separate from the MSC (1) which is usually contained within a single large housing. By transferring the partial CDR, upon receipt of the call answer message from the B-subscriber, to the external billing system the network operator is able to access the record at an early stage in a call for the purposes already set out above.

Figure 3:
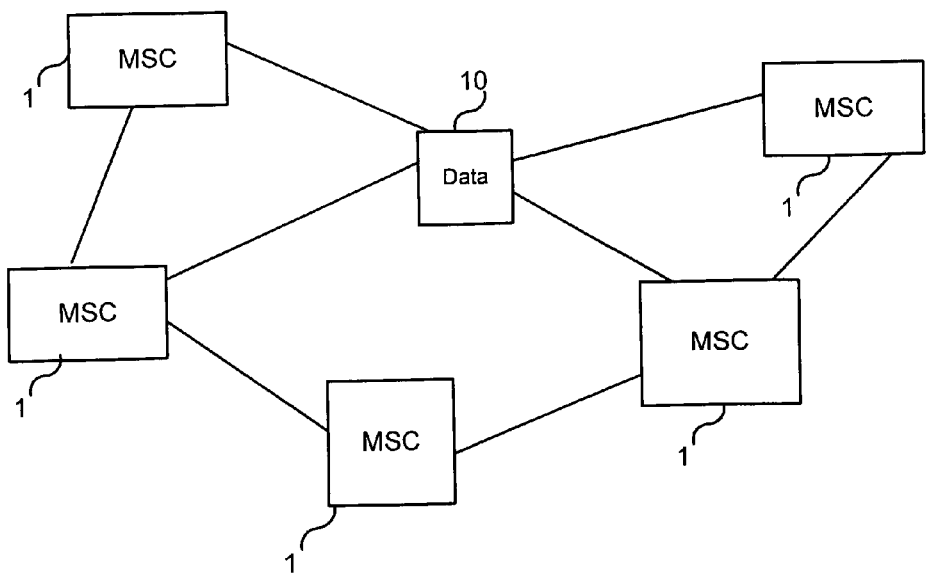
FIG. 3 illustrates an external billing system shared by a number of Mobile Switching Centres of a cellular radio telephone network.

The external billing system is typically shared by a number of MSCs 1 of the GSM network. This is illustrated in FIG. 3.

It will be appreciated by the person of skill in the art that various modifications may be made to the above described embodiment without departing from the scope of the present invention. For example, the exchange from which the CDR is output may be an exchange of a fixed access network rather than that of a cellular radio telephone network. In another modification, the partial CDR is output from the exchange to the external billing system during the call set-up phase, i.e. prior to the call answer message being received at the exchange from the B-subscriber. The CDR provided to the external billing system may include additional information such as the MSC identity, and the originating/terminating cell identity (Cell Global Identity) in the GSM network.

The invention claimed is:

1. A method of providing information relating to a telecommunication call, in a telecommunication network, to a data storage system, the method comprising:
   receiving caller identity information at an exchange of the network during a call set-up procedure between a calling device and the exchange, and storing the information at least temporarily at the exchange;
   sending an incoming call alert message to a called device; and
   prior to receiving a call answer message at the exchange outputting from the exchange to said data storage system a partial Call Data Record containing less call information than a normal Call Data Record.

2. A method according to claim 1, wherein the telecommunication network comprises a cellular radio telephone network and the call is made from a cellular radio telephone device.

3. A method according to claim 2, wherein the cellular radio telephone network is a GSM network and said exchange from which the partial Call Data Record is output is a Mobile Switching Center, the method comprising outputting from the Mobile Switching Center a partial Call Data Record comprising at least one of the subscriber telephone number, IMEI code, or IMSI code.

4. A method according to claim 1, wherein the telecommunication network comprises a fixed access network in which a telephone device is coupled to the exchange via land lines, the method further comprising outputting from the exchange at least the caller's telephone number (A-number).

5. A method according to claim 1 further comprising outputting said partial call data record to an external billing system in direct response to receipt of a call answer message, wherein said partial call data record consists of the caller's A-number, the caller's International Mobile Subscriber Identity code, the called party's B-number and the call start time.

6. Apparatus for providing information relating to a telecommunication call, in a telecommunication network, to a data storage system the apparatus comprising:
- first receiving means for receiving caller identity information at an exchange of the network during a call set-up procedure between a calling device and the exchange, and for storing the information at least temporarily at the exchange;
- transmitting means for transmitting an incoming call alert message to a called device;
- second receiving means for receiving, in the event that the called device answers or otherwise accepts the incoming call alert, a call answer message sent to the exchange; and
- output means for outputting, prior to receipt of said call answer message, from the exchange to said data storage system, a partial Call Data Record containing less call information than a normal Call Data Record.

7. Apparatus according to claim 6, wherein said first and second receiving means, said transmitting means, and said output means are provided as an integral part of the network exchange, said data storage system (10) is physically separate from the exchange and said partial Call Data Record is output from the exchange to said data storage system in response to receipt of said call answer message, wherein said partial call data record consists of the caller's A-number, IMSI code, called party's B-number and the call start time.

8. Apparatus according to claim 6, the network comprising a cellular radio telephone network and said exchange being a Mobile Switching Centre (MSC) of the cellular network.

9. A telecommunication network having a plurality of interconnected exchanges for routing calls in the network, and a billing system coupled to each of said exchanges, each exchange comprising:
- first receiving means for receiving caller identity information during a call set-up procedure between a calling device and the exchange, and for storing the information at least temporarily at the exchange;
- transmitting means for transmitting an incoming call alert message to a called device or to a called device via one or more further exchanges;
- second receiving means for receiving, in the event that the called device answers or otherwise accepts the incoming call alert, a call answer message sent to the exchange; and
- output means for outputting, prior to receipt of said call answer message, from the exchange to a data storage system, a partial Call Data Record containing less call information than a normal Call Data Record.

* * * * *